(12) United States Patent
Holt Nørby et al.

(10) Patent No.: US 11,552,306 B2
(45) Date of Patent: *Jan. 10, 2023

(54) CONTACT BETWEEN INTERCONNECT AND ELECTRODE

(71) Applicant: Haldor Topsøe A/S, Kgs. Lyngby (DK)

(72) Inventors: Tobias Holt Nørby, Glostrup (DK); Bengt Peter Gustav Blennow, Humlebæk (DK); Rainer Küngas, Copenhagen (DK); Jeppe Rass-Hansen, Copenhagen (DK); Thomas Heiredal-Clausen, Copenhagen (DK)

(73) Assignee: Topsoe A/S, Kgs. Lyngby (DK)

( * ) Notice: Subject to any disclaimer, the term of this patent is extended or adjusted under 35 U.S.C. 154(b) by 27 days.

This patent is subject to a terminal disclaimer.

(21) Appl. No.: 17/338,925

(22) Filed: Jun. 4, 2021

(65) Prior Publication Data

US 2021/0305588 A1 Sep. 30, 2021

Related U.S. Application Data

(63) Continuation of application No. 16/466,946, filed as application No. PCT/EP2017/081233 on Dec. 1, 2017, now Pat. No. 11,088,372.

(30) Foreign Application Priority Data

Dec. 16, 2016 (DK) .......................... PA 2016 00772

(51) Int. Cl.
*H01M 8/0228* (2016.01)
*H01M 8/021* (2016.01)
*H01M 8/0215* (2016.01)
*H01M 8/12* (2016.01)

(52) U.S. Cl.
CPC ......... *H01M 8/0228* (2013.01); *H01M 8/021* (2013.01); *H01M 8/0215* (2013.01); *H01M 2008/1293* (2013.01)

(58) Field of Classification Search
CPC .. H01M 8/0228; H01M 8/021; H01M 8/0215; H01M 2008/1293
See application file for complete search history.

(56) References Cited

U.S. PATENT DOCUMENTS

| 5,942,349 | A | 8/1999 | Badwal et al. |
| 9,115,032 | B2 | 8/2015 | Seabaugh et al. |
| 10,096,843 | B2 | 10/2018 | Leah et al. |
| 11,088,372 | B2 * | 8/2021 | Holt Nørby ........ H01M 8/0217 |
| 2003/0059335 | A1 | 3/2003 | Quadadakkers et al. |
| 2006/0193971 | A1 | 8/2006 | Tietz et al. |
| 2006/0286433 | A1 | 12/2006 | Rakowski et al. |
| 2009/0253020 | A1 | 10/2009 | Niewolak et al. |

(Continued)

FOREIGN PATENT DOCUMENTS

| EP | 2 267 826 A1 | 12/2010 |
| EP | 2 328 218 A1 | 6/2011 |

(Continued)

*Primary Examiner* — Jane J Rhee
(74) *Attorney, Agent, or Firm* — Blank Rome LLP (57) ABSTRACT

Improved contact between interconnect and oxygen electrode material is achieved through a contact point between an electrode or a contact layer and a coated ferritic stainless steel interconnect, where the coating on the metallic interconnect comprises Cu.

12 Claims, 7 Drawing Sheets

Fig. 1b (56) References Cited

U.S. PATENT DOCUMENTS

| | | |
|---|---|---|
| 2012/0258241 A1 | 10/2012 | Tucker |
| 2012/0295183 A1 | 11/2012 | Yamanis |
| 2013/0230792 A1 | 9/2013 | Wilson et al. |
| 2016/0233524 A1 | 8/2016 | Leah et al. |

FOREIGN PATENT DOCUMENTS

| | | |
|---|---|---|
| GB | 2524643 A | 9/2015 |
| JP | 015122225 A | 7/2015 |
| JP | 2018508955 A | 3/2018 |
| WO | WO 2009/017841 A2 | 2/2009 |
| WO | WO 2011/048307 A1 | 4/2011 |
| WO | WO 2016/128721 A1 | 8/2016 |

* cited by examiner

CONTACT BETWEEN INTERCONNECT AND ELECTRODE

CROSS-REFERENCE TO RELATED APPLICATIONS

This is a continuation of U.S. patent application Ser. No. 16/466,946, filed Jun. 5, 2019, which is a national stage of PCT/EP2017/081233, filed Dec. 1, 2017, which claims priority to Denmark Application No. PA 2016 00772, filed on Dec. 16, 2016, the entire contents of which are incorporated herein by reference.

FIELD OF THE INVENTION

The present invention relates to achievement of improved contact between interconnect and oxygen electrode material in solid oxide cell (SOC) stacks. More specifically, the invention concerns a contact point between an oxygen electrode or an oxygen-side contact layer of a solid oxide cell and a coated ferritic stainless steel interconnect in a solid oxide cell stack.

BACKGROUND

Solid oxide cells (SOCs) generally include cells designed for different applications, such as solid oxide fuel cells (SOFCs) and solid oxide electrolysis cells (SOECs) which in either case contain a solid electrolyte layer arranged in between two electrodes, one acting as cathode and the other acting as anode. These types of cells are well-known in the art and described in i.a. WO 2012/062341 and EP 2 194 597 A1, both belonging to the Applicant together with the Technical University of Denmark.

A solid oxide fuel cell comprises an oxygen-ion conducting electrolyte, an oxygen electrode (cathode) at which oxygen is reduced and a fuel electrode (anode) at which fuel (e.g. hydrogen, methane or natural gas) is oxidized. The overall reaction in an SOFC is that the used fuel and oxygen react electrochemically to produce electricity, heat and an oxidized species. The oxidized species is water if hydrogen is used as fuel, carbon dioxide if carbon monoxide is used as fuel, and a mixture of water and carbon dioxide for hydrocarbon fuels.

A solid oxide electrolysis cell comprises an oxygen-ion conducting electrolyte, a fuel electrode (cathode) at which an oxidized species (e.g. water or carbon dioxide or both) is reduced with the aid of an externally applied electric field, and an oxygen electrode (anode) at which oxygen ions are oxidized to molecular oxygen. The overall reaction in an SOEC is that the oxidized species are converted electrochemically into reduced species using electricity and heat. If the oxidized species fed into the stack is water, hydrogen is formed on the fuel electrode. If the oxidized species is carbon dioxide, carbon monoxide is formed on the fuel electrode. If the oxidized species is a mixture of water and carbon dioxide, then a mixture of carbon monoxide and hydrogen (also known as synthesis gas) is produced.

An SOEC operates at temperatures that are suitable for high-temperature electrolysis, i.e. temperatures similar to those of an SOFC (from about 500 to about 1100° C.). High operating temperatures are needed to ensure sufficiently high oxygen ion conductivity in the electrolyte. Commonly used electrolyte materials for SOCs include yttria-stabilized zirconia (YSZ), scandia-stabilized zirconia (ScSZ), gadolinia-doped ceria (CGO), samaria-doped ceria (CSO), strontium- and magnesium-doped lanthanum gallates (LSGM), and many others.

SOC electrodes are typically prepared from a composite of an electronically conductive material and the electrolyte oxide. For example, with electrolytes made from YSZ, the conventional fuel electrode is a Ni—YSZ, ceramic-metallic (cermet) composite. Similarly, oxygen electrodes are typically composites of the electrolyte material (e.g. YSZ or CGO) and oxygen electrode active materials. Oxygen electrode active materials include perovskites with a general formula $A_xBO_{3\pm\delta}$, where A and B denote metal ions, O denotes oxygen, x indicates the level of A-site non-stoichiometry (excess or deficiency) and $\delta$ is indicative of oxygen non-stoichiometry. Examples of relevant perovskites include materials such as strontium-doped lanthanum manganites (LSM), strontium-doped lanthanum ferrites (LSF), strontium-doped lanthanum cobaltites (LSC), strontium-doped lanthanum ferrite-cobaltites (LSCF), strontium-doped barium ferrite-cobaltites (BSCF), strontium-doped samarium cobaltites (SSC), and other perovskites known to those skilled in the art.

Oxygen electrode active materials may also include the so-called Ruddlesden-Popper (RP) phase materials having the general formula $A_{n-1}BnO_{3n+1\pm\delta}$, where A and B denote metal ions, O denotes oxygen, x indicates the level of A-site non-stoichiometry (excess or deficiency), $\delta$ is indicative of oxygen non-stoichiometry, and n is an integer. Relevant examples of RP phase materials include $Ln_2NiO_{4+\delta}$, where Ln is a lanthanide, A- or B-site doped $Ln_2NiO_{4+\delta}$, and other RP phases known to those skilled in the art. Ruddlesden-Popper phase materials include double perovskites with a general formula $(AA')_xB_2O_{5+\delta}$, where A, A', and B are metal ions, O denotes oxygen, x indicates the level of A-site non-stoichiometry (excess or deficiency) and $\delta$ is indicative of oxygen non-stoichiometry. Examples of relevant double perovskites include materials such as $LnBaCo_2O_{5+\delta}$, where Ln is a lanthanide, and other double perovskites known to those skilled in the art.

In order to ensure good in-plane electrical conductivity over the cell active area, contact layers are commonly deposited onto the electrodes of SOC. Oxygen-side contact layers typically comprise highly-conductive oxide materials, such as the perovskites, double perovskites, or the Ruddlesden-Popper phase materials listed above. In some cell designs, the electrode and contact layer functionalities are incorporated into a single layer, i.e. the same layer acts both as the active electrode and the contact layer.

In an SOC stack, a plurality of cells, each including a fuel electrode, an electrolyte, an oxygen electrode, and optionally contact layers, are connected in series by interposing interconnection plates (or interconnects) between each of the cells. The role of the interconnects is to provide electrical contact from one cell to the next, and to aid in the distribution of gases across the cell. In order to reduce electrical resistance arising from contact resistance between the cells and the interconnects, it is of great importance that the contacting between the cells and the interconnects is of good quality, i.e. possessing low electrical resistance and excellent mechanical stability regardless of operating conditions.

Suitable materials for metallic interconnects need to be oxidation resistant against gases fed to both oxygen and fuel electrodes under elevated operation temperatures, and they must further exhibit a thermal expansion coefficient (TEC) that matches the TEC of the ceramic components of the cell. In view of these requirements, particularly ferritic alloys forming chromium oxide surface layers (e.g. chromia-forming ferritic steels) are used as materials for the interconnect. Such alloys have a high chromium content (i.e. around 15-26 wt. %) which forms a protective chromium oxide barrier layer on the surface, protecting the interconnect against further oxidation. Examples of such high-chromium ferritic steels include, but are not limited to AISI 441, AISI 444, AISI 430, AISI 446, Crofer 22H, Crofer 22APU, ZMG G10, E-brite, Plansee ITM, etc.

During operation of an SOC stack, chromium species may diffuse from the chromium-containing metal interconnect materials into the adjacent oxygen electrode layers and thereby affect the catalyst performance disadvantageously and thus limit the cell performance over time. This phenomenon is generally known as "chromium poisoning". The chromium poisoning is due to the chromium in the metal interconnect being transported from the metal via gaseous chromium-containing oxides and oxy-hydroxides and to surface diffusion on the bridging metal oxide components to the electrochemically active sites near to or on the oxygen side of the electrode, where they quickly deteriorate the electrochemical activity to a considerable degree (*J. Electrochem. Soc.*, 154 (4), 2007, pages A295-A306).

Coatings for SOC stack interconnects can be deposited with various methods. Most commonly these coatings are either deposited as a metal or a ceramic. Ceramic coating are most commonly based on Mn—Co spinel compositions, whereas metallic coatings are most commonly based on cobalt. The main difference between metallic and ceramic coatings besides the deposition processes is that metallic coatings offer far better adhesion towards the ferritic steel interconnect. Adherence of ceramic coatings is based on van der Waals forces, whereas metallic coating offers metallic bonds which in many cases supersede the bulk strength of the ferritic steel material. The adhesion strength of ceramic coatings is furthermore dependent on a pre-oxidation step carried out in air in order to form a chromium oxide layer prior to deposition. The purpose of this pre-oxidation step is to add roughness on the interconnects material to obtain a somewhat better adhesion of the as-deposited ceramic coating due to mechanical interlocking. The ceramic deposition process is furthermore not able to produce dense coatings, and the adhesion towards the interconnect material is known to be problematic. For this reason, these coatings have the risk to spall upon heating and will therefore have inferior properties regarding protection against chromium poisoning and high temperature oxidation compared to metallic coatings.

Metallic coatings have the advantage that high adhesion strength towards the interconnect material can be obtained. Another advantage of metallic coatings is that the metallic coating process is very easy to upscale. Furthermore, the metallic coating processes are already implemented on a very large scale (electroplating) and continuously developed by for example the automotive industry. Therefore, electrodeposition of metallic coatings for interconnects use a far more developed process route which is also advantageous from the perspective of production cost.

In addition to chromium poisoning, another general problem leading to degradation or even to hard failure of SOC stacks is related to the (partial) loss of electrical contact between a cell and an interconnect in the stack. This (partial) loss of electrical contact is most likely to occur during dynamic operation, for example when the SOC stack is subjected to load cycles or thermal cycles. These changes in operation will inevitably create a thermal gradient across the SOC stack, which can have a negative influence on the mechanical contact between interconnect and cell. If thermally induced stresses arising from the thermal expansion or contraction of the components exceed the bonding strength between the interconnect and the cell, gaps can form at cell-interconnect contact points, effectively blocking electron transport. In the most severe case, contact between cell and interconnect is lost over a significant fraction of the cell active area, leading to rapid increase in ohmic resistance through the stack, thus causing degradation.

It is, therefore, desirable to find a novel coating for SOC interconnects, said coating being capable of ensuring contact points of sufficient mechanical strength to the oxygen side of a solid oxide cell.

The present invention discloses an improved contact point between interconnect and oxygen electrode material in a solid oxide cell stack. Generally, the main role of interconnect coatings is to slow down the volatilization of chromium species from the interconnect (thus reducing the risk of chromium poisoning) and to provide improved in-plane electrical conductivity over the interconnect surface. It has now surprisingly been found that some coatings comprising certain elements, especially coatings comprising Cu, have the additional benefit of improving the mechanical strength and lowering the electrical resistance of the contact between a coated metallic interconnect and either an oxygen-side contact layer (in case a contact layer is employed on the oxygen-side of the cell) or an oxygen electrode (in cell designs where the oxygen electrode acts both as the active electrode and contact layer, as described above).

It has furthermore been found that these elements act as a sintering aid towards some oxygen electrode materials and oxygen-side contact layer materials, which results in an improved contact between the cobalt-based interconnect coating and the oxygen electrode material at high temperatures. Here, the term 'sintering aid' refers to a functional additive or dopant that leads to a lowering of the sintering temperature of a material. The addition of a sintering aid can reduce the sintering temperature of a material in a number of ways, such as by forming a liquid phase, thus promoting the densification through liquid-phase sintering, and by acting as a scavenging agent for impurities. A liquid phase can be formed either because the sintering aid lowers the melting point of the bulk phase, because the sintering aid itself melts at the sintering temperature, or because the sintering aid forms a secondary phase which melts at the sintering temperature.

During high-temperature treatment, a fraction of the Cu in the coating diffuses into the adjacent oxygen-side contact layer or oxygen electrode. The mechanical strength (also referred to as pull-off strength or adhesion strength or bonding strength) and electrical conductivity of a contact point formed in such a way is superior compared to copper-free coatings due to the lower sintering activity found when copper is not present. The pull-off strength of a contact point can be evaluated for example by standardized dolly pull-off tests (e.g. ASTM D 4541 or ISO 4624) or modified three-point bending tests (e.g. Boccaccini et al., *Materials Letters*, 162 (2016), 250)).

So the present invention relates to a coated interconnect bonded to the oxygen electrode material of a solid oxide cell through the coating, which has obtained improved contact properties through sintering, thereby providing a strong bond between the interconnect and the oxygen electrode material. More specifically, the invention concerns a contact point between a solid oxide cell and an interconnect of a solid oxide stack, said contact point comprising:

a ferritic stainless steel interconnect substrate covered by a chromium oxide layer, which is coated by a coating comprising an element that acts as a sintering aid, and an oxygen electrode or an oxygen-side contact layer of a solid oxide cell, where the element functions as a sintering aid towards the oxygen electrode or oxygen-side contact layer materials.

Further, the invention concerns a method for creating a contact point with a high mechanical strength between the coating on an interconnect and the oxygen electrode or the oxygen-side contact layer of a solid oxide cell (SOC), said method comprising the steps of:

providing a ferritic stainless steel interconnect substrate, coating the oxygen side of the interconnect substrate with a coating comprising an element that acts as a sintering aid, providing a solid oxide cell, and sintering the coated interconnect substrate and the solid oxide cell by heat treatment in air, where the element functions as a sintering aid towards the oxygen electrode or oxygen-side contact layer materials.

The element that acts as a sintering aid is preferably Cu.

The coating on the metallic interconnect preferably comprises an oxide of Cu and Fe, an oxide of Cu and Ni, an oxide of Cu and Cu, an oxide of Cu, Co and Ni, or an oxide of Cu, Co, Ni and Fe.

Preferably, the oxygen electrode or oxygen-side contact layer material comprises a perovskite, a double perovskite, or a Ruddlesden-Popper phase material.

US 2003/0059335 A1 provides a high temperature material comprising a chromium oxide forming an iron-based alloy containing a) 12-28 wt % chromium, b) 0.01 to 0.4 wt % La, c) 0.2 to 1.0 wt % Mn, d) 0.05 to 0.4 wt % Ti, e) less than 0.2 wt % Si, f) less than 0.2 wt % Al with the property that at temperatures of 700° C. to 950° C. said high temperature material is capable of forming at its surface a $MnCr_2O_4$ spinel phase. According to the authors, the object of their invention is to provide a bi-polar plate for a high temperature fuel cell or for spark plugs. A disadvantage of said invention is that the interconnects (bipolar plates) produced this way will adhere poorly to the cells and the contact points between the interconnect and cells will have a high contact resistance.

US 2013/0230792 A1 discloses a coated interconnect for a solid oxide fuel cell including a substrate comprising iron and chromium and a manganese cobalt oxide spinel coating formed over an air side of the interconnect substrate and a method of making and treating thereof. A disadvantage of that invention is that the production of interconnects by powder metallurgy and plasma spraying is very expensive and time consuming. Furthermore, the interconnect used in the above invention is not ferritic stainless steel, but a CFY (Cr—Fe—Y) alloy, which is designed for solid oxide cells operating above 900° C.

A method of producing a protective coating on a $Cr_2O_3$ forming substrate is described in US 2006/0193971 A1. The method consists in applying a mixture of CoO, MnO, and CuO onto a surface of the substrate already having a layer of $Cr_2O_3$ and treating the substrate at 500-1000° C., thereby converting the applied oxides to a gas-tight, chromium-free spinel coating on the substrate. However, as mentioned above, such ceramic coatings are disadvantageous compared to metallic coatings with respect to the as-deposited adhesion strength towards the metallic interconnect material. This means that the described coating exhibits a low adhesion strength (van der Waals bonds) before it is heat treated to the resulting coating. Therefore, there is a high risk of having spallation of these types of coatings, thus creating contacting points having a low mechanical integrity (weak interfaces) with respect to thermally induced stresses.

U.S. Pat. No. 9,115,032 B2 discloses a method of densifying a lanthanide chromite ceramic or a mixture containing a lanthanide chromite ceramic by mixing the chromite ceramics with sintering aids and sintering the mixture. The sintering aids comprise one or more spinel oxides, e.g. $ZnMn_2O_4$, $MgMn_2O_4$, $MnMn_2O_4$ and $CoMn_2O_4$. According to the authors, applications of such lanthanide ceramics include solid oxide fuel cells.

WO 2016/128721 A1, EP 2 267 826 A1, US 2005/0942349 A and EP 2 328 218 A1 disclose various coatings containing oxides comprising Cu. The objective of each of the described inventions is to deposit coatings that enable enhanced corrosion protection and improvement of the electrical conductivity, thereby lowering the ohmic resistance of the interconnect. However, a coating comprising Cu can be considered disadvantageous if such coating results in contact points with low adhesion strength towards the oxygen electrode or the oxygen contact layer of the solid oxide cell. During dynamic operation (load cycles, thermal cycles, changes in operating point) or due to interconnect creep during long-term operation at a constant operating point, gaps can form at cell/interconnect contact points, effectively blocking the electron transport within the stack. This will lead to rapid increase in ohmic resistance throughout the stack, thus causing degradation and affecting the robustness of the stack negatively.

A method to avoid inter-diffusion between metallic nickel and interconnect is described in US 2009/0253020 A1. This is proposed to be done by applying a cupriferous layer between the nickel-containing part of a fuel cell and the interconnect. It is furthermore proposed that the interconnect undergoes a heat treatment to promote chromium oxide to form on the interconnect before applying the cupriferous layer. The invention described in US 2009/0253020 A1 relates to a known diffusion issue with Ni, causing austenite phase to form in the ferritic steel interconnect, on the anode side of a fuel stack. Therefore, this does not relate to the present invention which has its focus on obtaining an improved contact point between oxygen electrode or oxygen contact layer and interconnect.

BRIEF DESCRIPTION OF THE DRAWINGS

The present invention is described further in the examples which follow. In the examples, reference is made to the Figures, where.

DETAILED DESCRIPTION

Example 1 (Comparative Art)

Figure 1A:
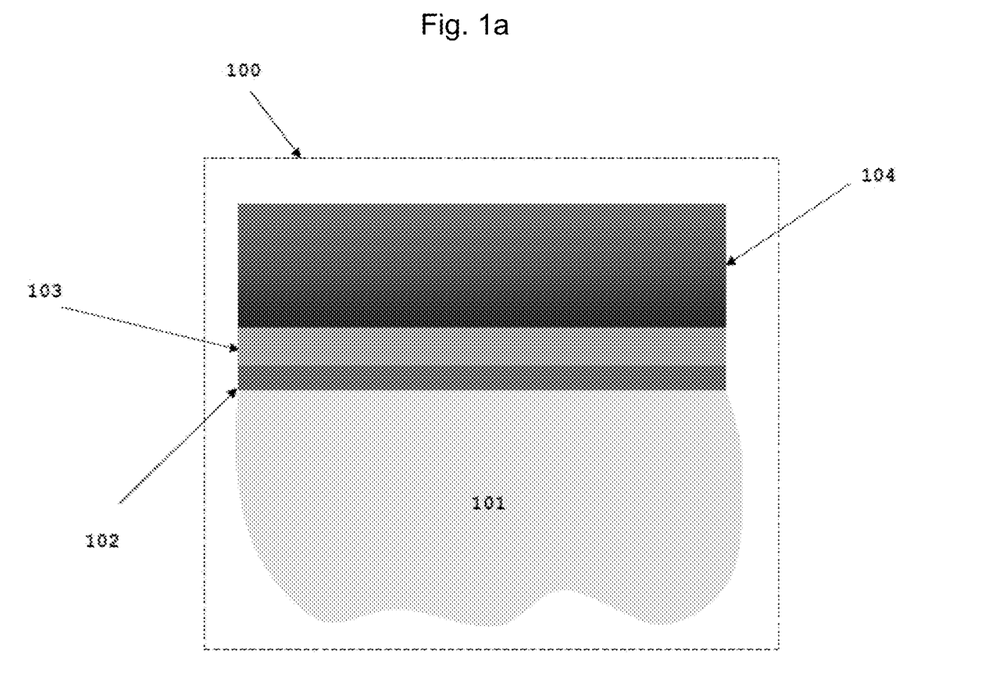
FIGS. 1a, 1b and 1c illustrate a contact point, a scanning electron microscopy (SEM) image of the contact point and the voltage drop across the contact point, respectively, according to the prior art.
Figure 1B:
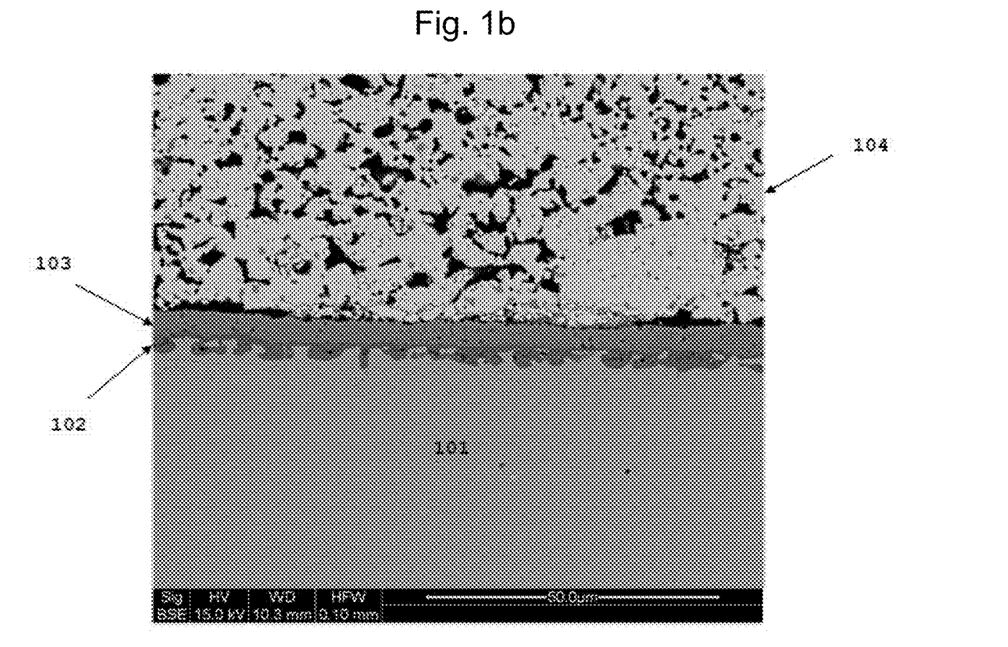
Figure 1C:
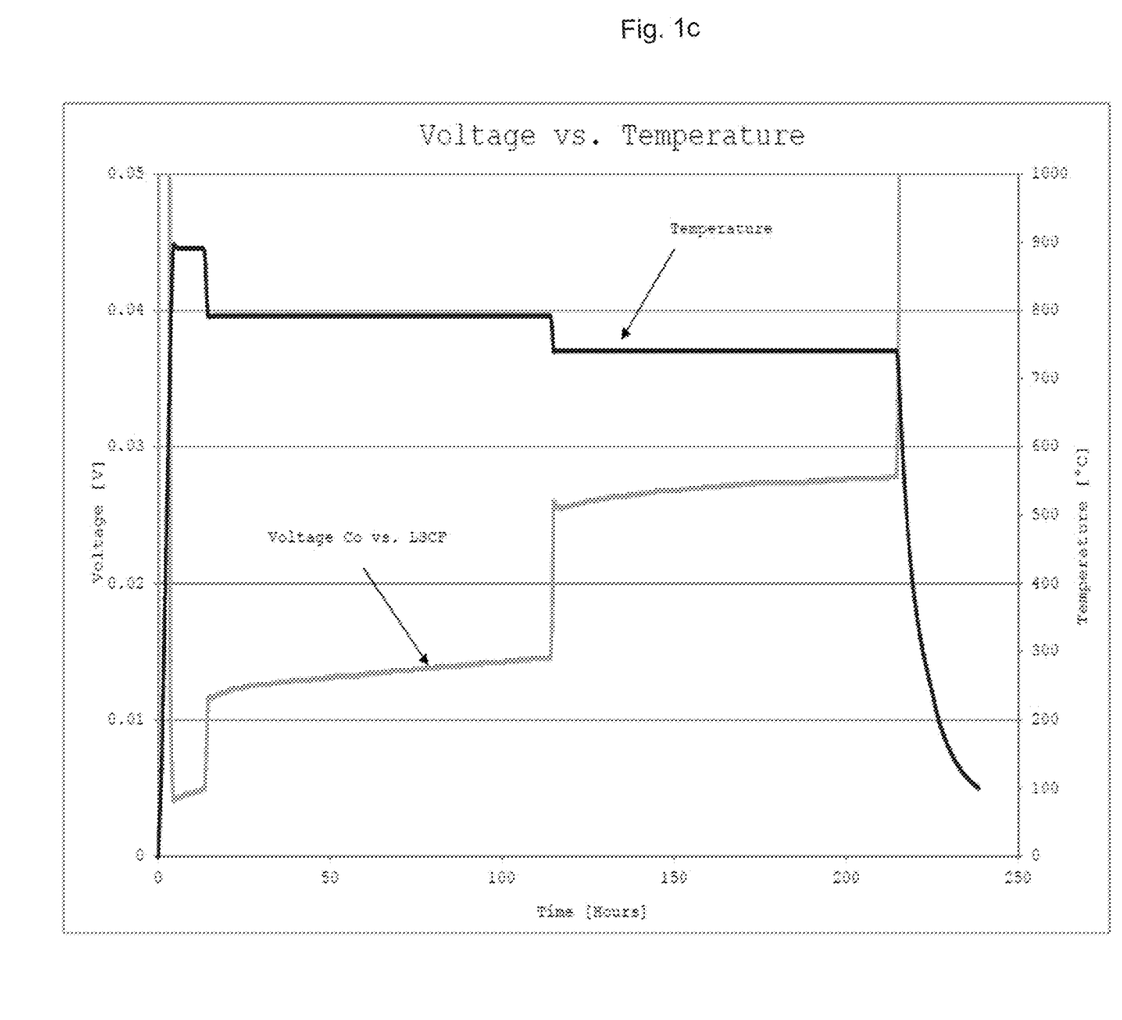

FIG. 1a presents a schematic drawing of a contact point 100 formed by a coated metallic interconnect and a solid oxide cell that can be considered prior art. The chromia forming ferritic stainless steel interconnect 101 is covered by a chromia layer 102 and an oxide coating 103 rich in Co, Mn, and Fe, but poor in Cr. The coated interconnect is in contact with the oxygen-side contact layer 104 of a solid oxide cell. FIG. 1b shows a scanning electron microscopy image of such a contact point. The adhesion strength of such a contact point is relatively low, as is evident from the micrograph, considering the interface between coating 103 and oxygen-side contact layer 104. The electrical properties of such a contact point were evaluated by exposing a structure consisting of a porous LSCF disk with a diameter of 10 mm, a 0.3 mm thick square piece of a coated stainless steel interconnect with a side length of 20 mm, and another porous LSCF disk with a diameter of 10 mm to elevated temperatures in air. A direct current of 1 A was applied through the structure, while a compressive loading of 3 MPa was applied via a load cell. Voltage drop through the structure is mostly governed by the resistance of the contact points, as the resistance of bulk interconnect steel and bulk LSCF is much lower than contact point resistance. According to FIG. 1c, voltage drop across such a contact point is approximately 5 mV at 900° C., 14.5 mV at 800° C., and 28 mV at 750° C. After measurement, it is relatively easy to remove the LSCF disks from the interconnect, indicating relatively low adhesion strength of contact point.

Example 2

Figure 2A:
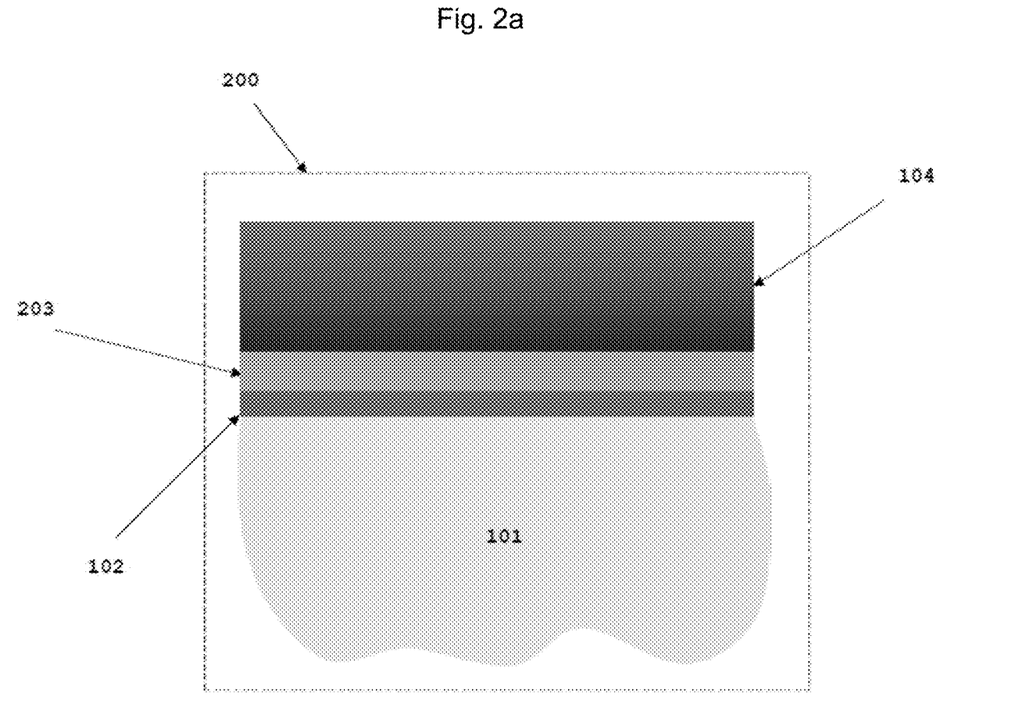
FIGS. 2a, 2b and 2c illustrate a contact point, a scanning electron microscopy (SEM) image of the contact point and the voltage drop across the contact point, respectively, according to the present invention.
Figure 2B:
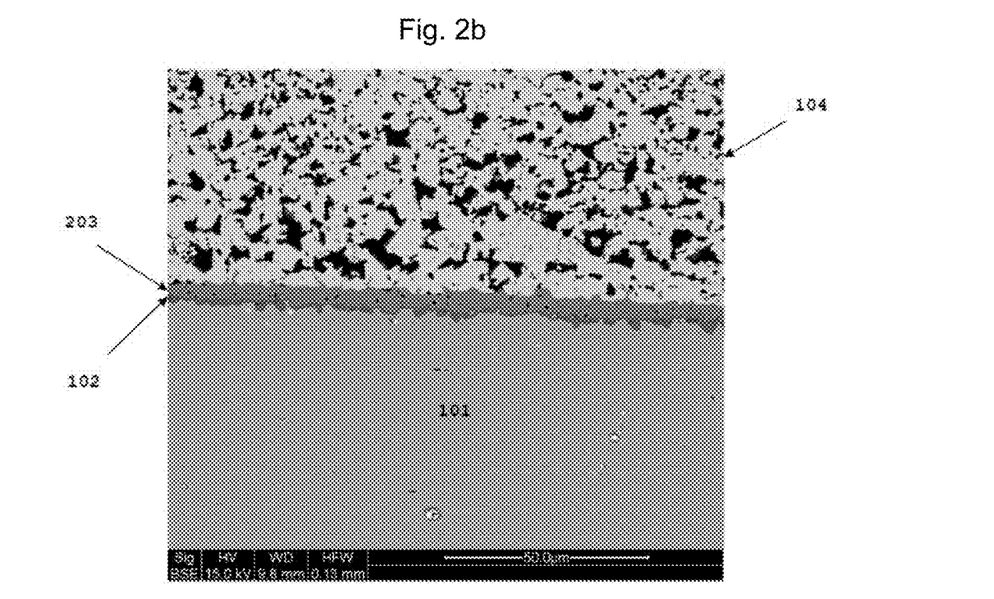

FIG. 2a presents a schematic drawing of a contact point 200 formed by a coated metallic interconnect and a solid oxide cell according to the present invention. The chromia forming ferritic stainless steel interconnect 101 is covered by a chromia layer 102 and an oxide coating 203 rich in Co, Mn, Cu, and Fe, but poor in Cr. The coated interconnect is in contact with the oxygen-side contact layer 104 of a solid oxide cell. FIG. 2b shows a scanning electron microscopy image of such a contact point. The adhesion strength of such a contact point is expected to be significantly higher than that of Example 1, as is evident from the micrograph. It is noteworthy that the oxide coating 203 has partially diffused into the oxygen-side contact layer 104, and that several particles of the oxygen side contact layer 104 are partially or completely encapsulated by the coating.

Figure 2C:
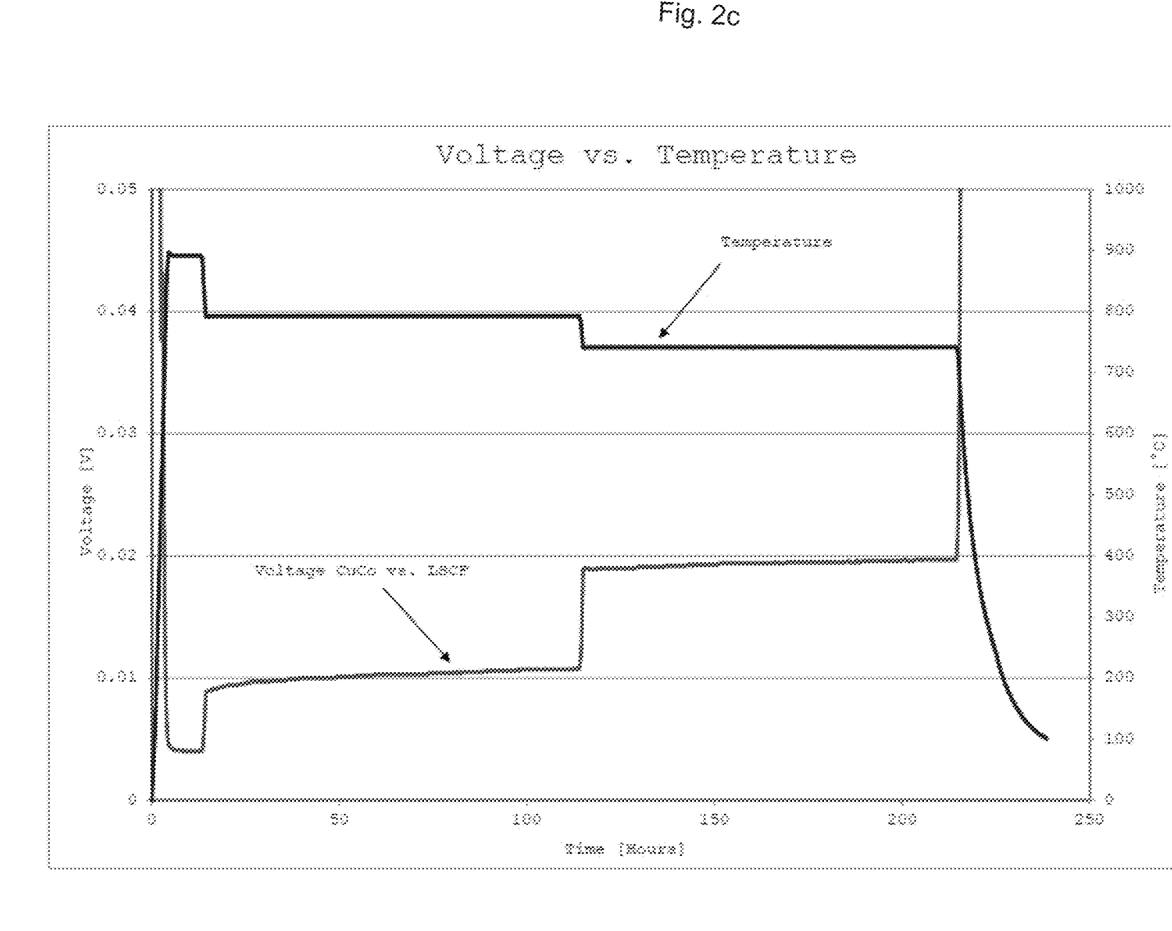

The electrical properties of such a contact point were evaluated using the same setup and under identical conditions as described in Example 1. According to FIG. 2c, voltage drop across such a contact point is approximately 4 mV at 900° C., 10.5 mV at 800° C., and 20 mV at 750° C. After measurement, it is relatively much more difficult to remove the LSCF disks from the interconnect, indicating a relatively high adhesion strength of the contact point compared to Example 1.

Example 3

Figure 3A:
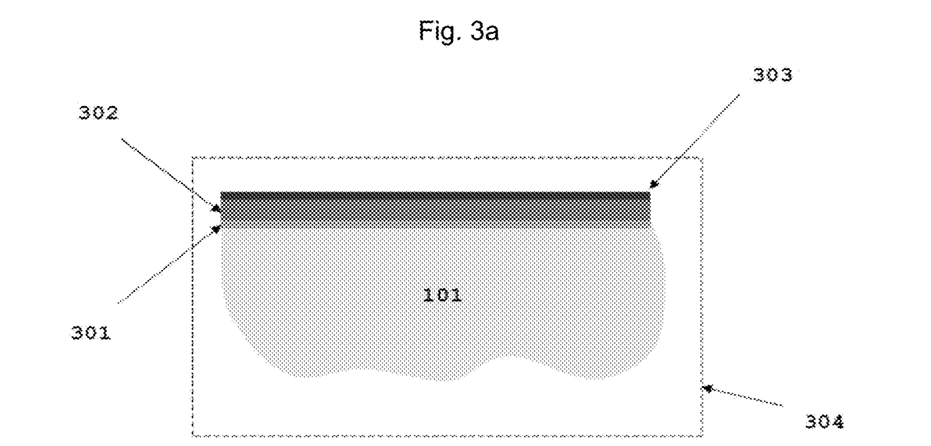
FIG. 3a shows the deposition of a third metallic layer on top of the structure by ion exchange plating, further explained in FIGS. 3b and 3c, all according to the present invention.
Figure 3B:
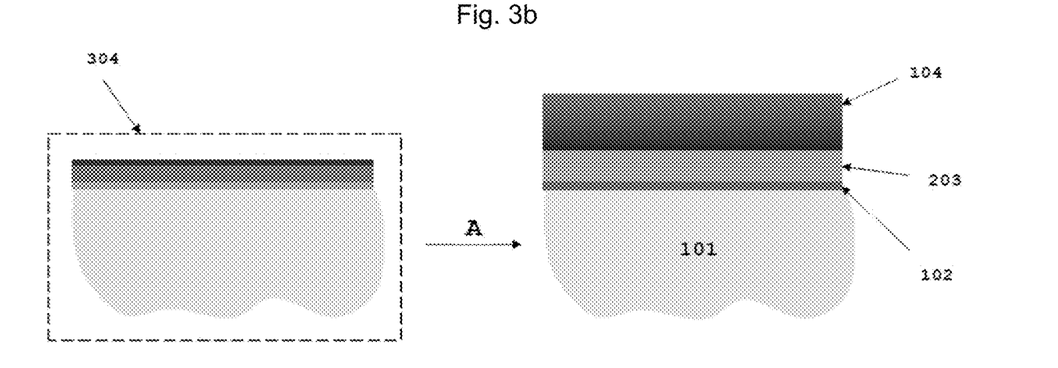
Figure 3C:
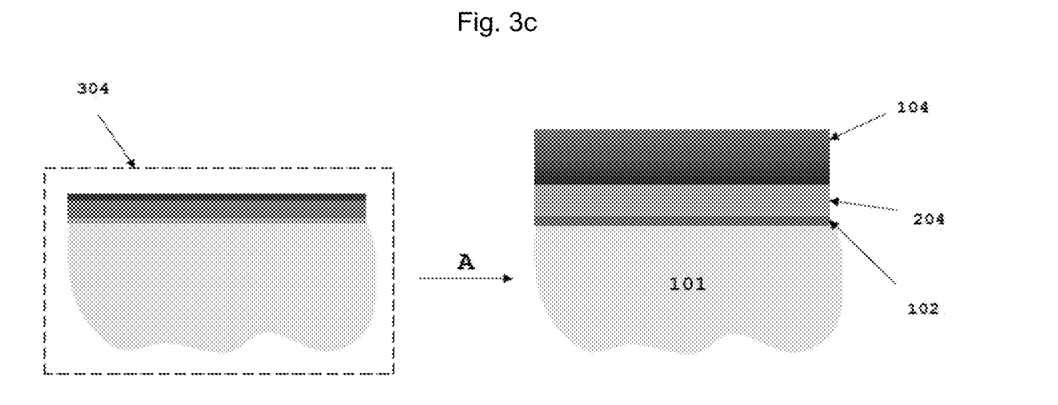
Figure 4A:
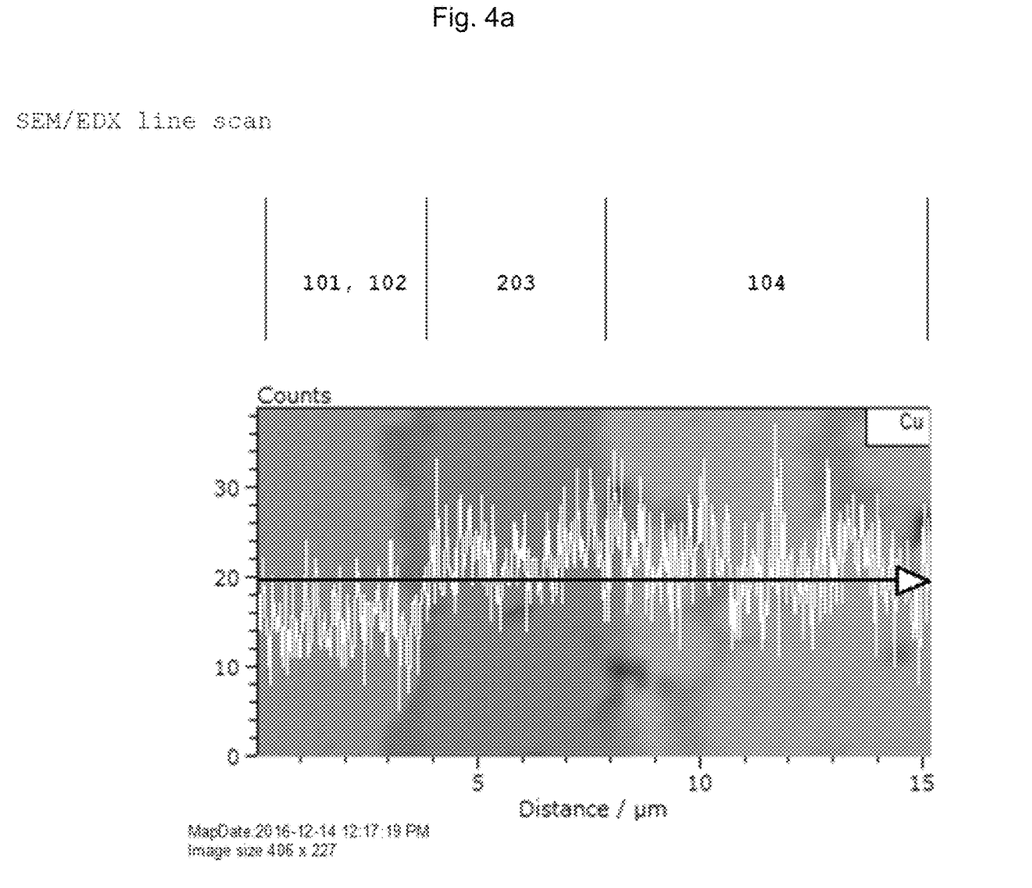
FIGS. 4a and 4b illustrate an EDX (energy-dispersive X-ray analysis) line scan (4a) with point analysis (4b), both according to the present invention.
Figure 4B:
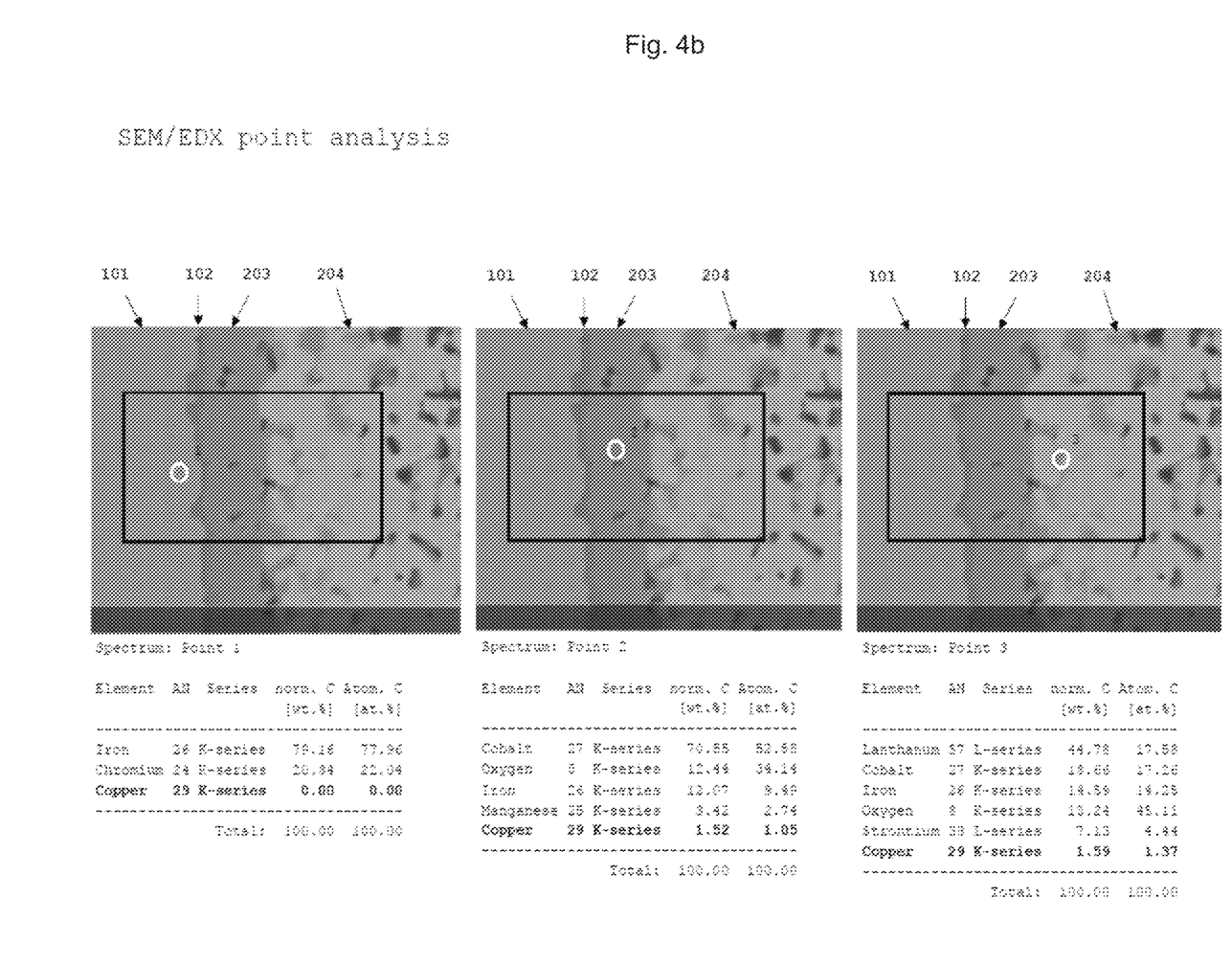

A metallic coating on the surface of a ferritic stainless steel interconnect substrate 101 is formed by coating the oxygen side of the interconnect substrate first with a strike layer of Co or Ni 301 by electrodeposition, followed by electrodeposition of an additional layer 302 consisting of Co on top of the strike layer 301. A third metallic layer of Cu 303 is deposited by ion exchange plating on top of the structure comprising the interconnect substrate 101 and the coating layers 301 and 302 (FIG. 3a). The thickness of the Cu layer 303 is approximately 100-200 nm. To form the contact point 200, thus formed coated interconnect 304 is taken into contact with the oxygen-side contact layer 104 of a solid oxide cell at a temperature exceeding 800° C. This step is explained as A in FIG. 3b and FIG. 3c. At this temperature, the metallic coatings 301, 302 and 303 are oxidized, forming an oxide coating 203 rich in Co, Mn, Cu, and Fe in the case of a Co strike layer (FIG. 3b), and 204 rich in Co, Mn, Cu, Fe with small amounts of Ni in the case of a Ni strike layer (FIG. 3c). Both formed oxide coatings 203, 204 are thus poor in Cr. Simultaneously, a chromia layer 102 is formed between the interconnect substrate 101 and the oxide coatings 203 and 204. Also simultaneously, a fraction of the Cu in the oxide coatings 203 or 204 diffuses into the oxygen-side contact layer 104 of a solid oxide cell, acting as a sintering aid. Hereby, the contact point 200 (FIG. 2a) is formed in the case where the oxide coating is 203. In FIGS. 4a and 4b, an EDX (energy-dispersive X-ray analysis) line scan with point analysis across the interface of the oxide coating 203 and the oxygen-side contact layer 104 is shown, indicating that a fraction of the Cu from the oxide coating 203 has diffused into the oxygen-side contact layer 104.

The invention claimed is:

1. A method for creating a contact point between a coating on an interconnect and an electrode or contact layer, comprising the steps of:
   providing a ferritic stainless steel interconnect substrate,
   depositing at least one layer of Co or Ni on the interconnect substrate;
   coating the layer of Co or Ni on the interconnect substrate with a coating comprising Cu having a thickness of approximately 100-200 nm, and
   sintering the coated interconnect substrate and the electrode or contact layer by heat treatment in air at a temperature exceeding 800° C.,
   where the Cu in the coating functions as a sintering aid towards the electrode or contact layer material, and a fraction of the Cu in the coating diffuses into the electrode or contact layer, thereby increasing the adhesion strength and lowering the electrical resistance of the contact point between the coated interconnect substrate and the electrode or contact layer.

2. The method of claim 1, wherein the contact point is created between the coating of the interconnect and the electrode of a solid oxide fuel cell.

3. The method of claim 1, wherein the contact point is created between the coating of the interconnect and an oxygen contact layer of a solid oxide fuel cell.

4. The method of claim 1, wherein the coating on the interconnect comprises an oxide of Cu and Fe, an oxide of Cu and Ni, an oxide of Cu and Cu, or an oxide of Cu, Co and Ni, or an oxide of Cu, Co, Ni and Fe.

5. The method of claim 1, wherein the electrode or contact layer material comprises a perovskite, a double perovskite, or a Ruddlesden-Popper phase material.

6. The method of claim 2, wherein the adhesion strength of the contact point is of the same order of magnitude as the adhesion strength between an electrolyte and a barrier layer of the solid oxide fuel cell.

7. The method of claim 2, wherein the operating temperature of the solid oxide fuel cell is between 500° C. and 900° C.

8. A solid oxide fuel cell stack including a contact point between a coating on an interconnect and an electrode or contact layer of a solid oxide fuel cell of the stack, wherein the contact point is created by a method comprising the steps of:
providing a ferritic stainless steel interconnect substrate,
depositing at least one layer of Co or Ni on the interconnect substrate;
coating the layer of Co or Ni on the interconnect substrate with a coating comprising Cu having a thickness of approximately 100-200 nm, and
sintering the coated interconnect substrate and the electrode or contact layer of the solid oxide fuel cell by heat treatment in air at a temperature exceeding 800° C.,
where the Cu in the coating functions as a sintering aid towards the electrode or contact layer material of the solid oxide fuel cell, and a fraction of the Cu in the coating diffuses into the electrode or contact layer of the solid oxide fuel cell, thereby increasing the adhesion strength and lowering the electrical resistance of the contact point between the coated interconnect substrate and the electrode or contact layer of the solid oxide fuel cell.

9. The solid oxide fuel cell stack of claim 8, wherein the coating on the interconnect comprises an oxide of Cu and Fe, an oxide of Cu and Ni, an oxide of Cu and Cu, or an oxide of Cu, Co and Ni, or an oxide of Cu, Co, Ni and Fe.

10. The solid oxide fuel cell stack of claim 8, wherein the electrode or contact layer material of the solid oxide fuel cell comprises a perovskite, a double perovskite, or a Ruddlesden-Popper phase material.

11. The solid oxide fuel cell stack of claim 8, wherein the adhesion strength of the contact point is of the same order of magnitude as the adhesion strength between an electrolyte and a barrier layer of the solid oxide fuel cell.

12. The solid oxide fuel cell stack of claim 8, wherein the operating temperature of the solid oxide fuel cell is between 500° C. and 900° C.

* * * * *